United States Patent [19]

Decker et al.

[11] 4,040,393
[45] Aug. 9, 1977

[54] IGNITED INTERNAL COMBUSTION ENGINE OPERATED WITH CHARGE STRATIFICATION

[75] Inventors: Gerd Decker, Vorsfelde; Dieter Steinke; Kurt Reichel, both of Wolfsburg, all of Germany

[73] Assignee: Volkswagenwerk Aktiengesellschaft, Germany

[21] Appl. No.: 554,085

[22] Filed: Feb. 28, 1975

[30] Foreign Application Priority Data

Mar. 8, 1974 Germany ............................ 2411080

[51] Int. Cl.² .............................................. F02M 31/00
[52] U.S. Cl. ............................... 123/30 A; 123/33 D; 123/34 A; 123/122 AB
[58] Field of Search ............... 123/32 C, 32 D, 32 K, 123/32 ST, 32 SP, 33 C, 122 A, 122 G, 122 AB, 122 AA, 30 A, 34 A, 33 D

[56] References Cited

U.S. PATENT DOCUMENTS

| 796,479 | 8/1905 | Wassmann et al. | 123/30 A |
|---|---|---|---|
| 1,123,406 | 1/1915 | Severin et al. | 123/32 D |
| 1,329,797 | 2/1920 | Raabe | 123/32 D |
| 1,576,254 | 3/1926 | Sumner | 123/32 SP |
| 1,709,744 | 4/1929 | Schnurte | 123/34 A |
| 1,878,165 | 9/1932 | Moorehouse | 123/34 A |
| 2,057,318 | 10/1936 | Schwaiger | 123/32 D |
| 2,141,435 | 12/1938 | Hansen et al. | 123/34 A |
| 2,179,278 | 11/1939 | Wurtele | 123/33 D |
| 2,799,257 | 7/1957 | Stumpfig et al. | 123/34 A |
| 2,808,036 | 10/1957 | Von Seggern et al. | 123/32 SP |
| 2,855,908 | 10/1958 | Pflaum | 123/32 D |
| 3,867,915 | 2/1975 | Sakurai et al. | 123/32 SP |
| 3,890,942 | 6/1975 | Date et al. | 123/122 AB |

Primary Examiner—Carroll B. Dority, Jr.
Attorney, Agent, or Firm—Brumbaugh, Graves, Donohue & Raymond

[57] ABSTRACT

An internal combustion engine with charge stratification and spark ignition comprises a main combustion chamber and an auxiliary combustion chamber, the main combustion chamber and the auxiliary combustion chamber being interconnected by a short passage. The auxiliary combustion chamber has a wall, at least a portion of which is contiguous with an exhaust conduit of the main combustion chamber. When hot exhaust gases from the main combustion chamber are flowing through the exhaust conduit, the portion of the wall of the auxiliary combustion chamber contiguous with the exhaust conduit is in direct heat exchange contact with the hot exhaust gases for rapidly heating the auxiliary combustion chamber to a temperature within an optimum range to prevent condensation from forming therein.

5 Claims, 2 Drawing Figures

IGNITED INTERNAL COMBUSTION ENGINE OPERATED WITH CHARGE STRATIFICATION

BACKGROUND OF THE INVENTION

The present invention relates essentially to a spark ignited internal combustion engine operated with charge stratification having a main combustion chamber and an auxiliary combustion chamber or prechamber connected to the main combustion chamber by means of a short passage. The auxiliary combustion chamber is provided with a fuel delivery device and an ignition device for igniting a combustible fuel-air mixture which is richer, in fuel content, than the fuel-air-mixture in the main combustion chamber.

Spark ignited internal combustion engines of the type operated with stratified charges have been known for many years. Although many variations of this type of internal combustion engine have been developed, the fundamental concept of all stratified charge engines has been, through structural measures, to diversify the mixture composition of the cylinder charge, at the instant of ignition, in such a manner that an ignitable fuel-rich mixture is present in the immediate vicinity of the spark plug, while the charge in the remaining combustion chamber is adjusted to properly coincide with the prevailing operating conditions of the engine. This latter combustion charge may therefore consist of a fuel-lean mixture or even of air.

Heretofore such engine designs have been aimed at ensuring the safe ignition of the cylinder charge, notwithstanding wide variations in the total mixture composition, and facilitating carburetor-fueled operation at higher compression ratios without reaching the knock limit. Currently, however, the stratified charge method is viewed primarily as an expedient for reducing the noxious substances, e.g., nitric oxides, contained in the engine emissions.

In addition to the internal combustion engines wherein the stratification of the charge is achieved by a precisely timed injection of the fuel into a turbulent stream of air produced in the combustion chamber, other stratified charge internal combustion engines are known wherein the combustion chamber is divided into a main combustion chamber, delimited by the piston, and an auxiliary combustion chamber or prechamber in communication with the main combustion chamber and arranged separately in the cylinder head. The auxiliary combustion chamber is provided with an ignition device, e.g., a spark plug, and a fuel delivery device consisting either of a fuel injection nozzle or an auxiliary intake valve for delivery of a fuel-rich mixture prepared by an auxiliary carburetor. The auxiliary combustion chamber is connected with the main combustion chamber by a short passage so that, following ignition of the fuel-rich charge present in the auxiliary combustion chamber, a flame front can advance into the main combustion chamber for the purpose of igniting the residual cylinder charge in the main combustion chamber. Accordingly, the residual cylinder charge may be much leaner, in fuel content, than the charge in the auxiliary combustion chamber and may be varied in dependence upon the engine load, whereby delayed combustion occurs with lower combustion peak temperatures and peak pressures.

In operation of the internal combustion engines of this type, it has been found that the wall temperature of the auxiliary combustion chamber has a decisive influence on the preparation and homogenization of the fuel-rich mixture in the auxiliary combustion chamber. More particularly, during the cold starting and the warming-up phase of the internal combustion engine, i.e., when the walls of the auxiliary combustion chamber have not yet attained operating temperatures, the fuel of the comparatively fuel-rich mixture present in the auxiliary combustion chamber has a tendency to condense heavily on the cold auxiliary combustion chamber walls. Due to the reduction in the fuel content of the auxiliary combustion chamber mixture caused by this condensation, defective operation of the internal combustion engine occurs resulting in misfiring, stalling, and the like. In an effort to compensate for the reduction in fuel content, an increase in the quantity of fuel delivered to the auxiliary combustion chamber, during these critical operating periods, results in the faulty combustion of the increased quantity of fuel which can be only imperfectly combusted, thereby increasing the noxious substances in the engine emissions.

On the other hand, when the walls of the auxiliary combustion chamber attain excessively high temperatures, resulting from higher loads on the internal combustion engine, there exists the danger of spontaneous ignition. To avert these shortcomings, a temperature ranging from 200° to 300° C may be considered a favorable wall temperature for the auxiliary combustion chamber. However, it is also desirable that such a temperature range be attained as rapidly as possible after the cold starting of the internal combustion engine and that the temperature be maintained, if possible, throughout the entire operation of the engine.

An internal combustion engine described in German Offenlegungsschrift No. 2,302,015 comprises an auxiliary combustion chamber consisting of a metal tube which is heated by means of an electric heating coil wrapped around the metal tube. However, this design necessitates increased construction cost, due to the structural modifications required to accommodate the heating coil. On the other hand, because the energy consumed by the electric heating coil, in order to effectively heat the auxiliary combustion chamber, creates a considerable additional energy requirement, operating cost is also increased.

SUMMARY OF THE INVENTION

It is an object of the present invention to provide a spark ignited internal combustion engine, of the type operating with charge stratification, which avoids the difficulties and disadvantages of the prior art engines noted above.

This object, as well as other objects which will become apparent in the discussion that follows, are achieved, according to the present invention, by raising the temperature of at least a portion of the auxiliary combustion chamber wall, as soon as possible after the cold starting of the internal combustion engine, to an optimum temperature range and maintaining the temperature, if possible, within the optimum range throughout the entire operating period of the engine.

In accordance with the present invention, at least a portion of an outer surface of the auxiliary combustion chamber is in direct heat exchange contact with hot exhaust gases emitted from the main combustion chamber of the internal combustion engine. Thus, the hot exhaust gases of the internal combustion engine heat the auxiliary combustion chamber and maintain it at an elevated temperature, whereby fuel components of a fuel-air mixture present in the auxiliary combustion chamber are rapidly evaporated. Thus, the formation of a homogeneous and easily ignitable fuel-air mixture is ensured, thereby contributing to perfect ignition and combustion products low in noxious substances.

In accordance with a preferred embodiment of an internal combustion engine according to the present invention, the auxiliary combustion chamber may be located in the immediate vicinity of an exhaust conduit of the main combustion chamber, such that at least a portion of the outer surface of the auxiliary combustion chamber projects into the exhaust conduit. When hot exhaust gases are flowing through the exhaust conduit, the portion of the outer surface of the auxiliary combustion chamber projecting into the exhaust conduit is in direct heat exchange contact with the hot exhaust gases. Preferably, the portion of the outer surface of the auxiliary combustion chamber projecting into the exhaust conduit may be thin-walled and represent approximately 30 to 50% of the total wall area of the auxiliary combustion chamber. Moreover, in internal combustion engines in which a fuel delivery device, consisting of an injection nozzle projecting into the auxiliary combustion chamber, is utilized, evaporation of the fuel in the auxiliary combustion chamber may be enhanced by positioning the nozzle in such a manner that the conical spray delivered by it impinges on an inner surface of the auxiliary combustion chamber adjacent the portion of the outer surface which is in direct heat exchange contact with the hot exhaust gases.

Thus, there is provided, in accordance with the present invention, a novel and improved internal combustion engine with charge stratification and spark ignition in which at least a portion of the auxiliary combustion chamber may be heated at comparatively little expense and effort so that unfavorable operating behavior characterized by misfirings and the like, during the cold starting and the warming-up phase of the engine, can be substantially improved. More particularly, elimination of the misfirings and the like substantially reduces the amount of unfavorable noxious substances in the engine emissions.

BRIEF DESCRIPTION OF THE DRAWING

For a further understanding of the present invention, reference may be had to the accompanying drawing, in which.

DESCRIPTION OF THE PREFERRED EMBODIMENTS

Figure 1:
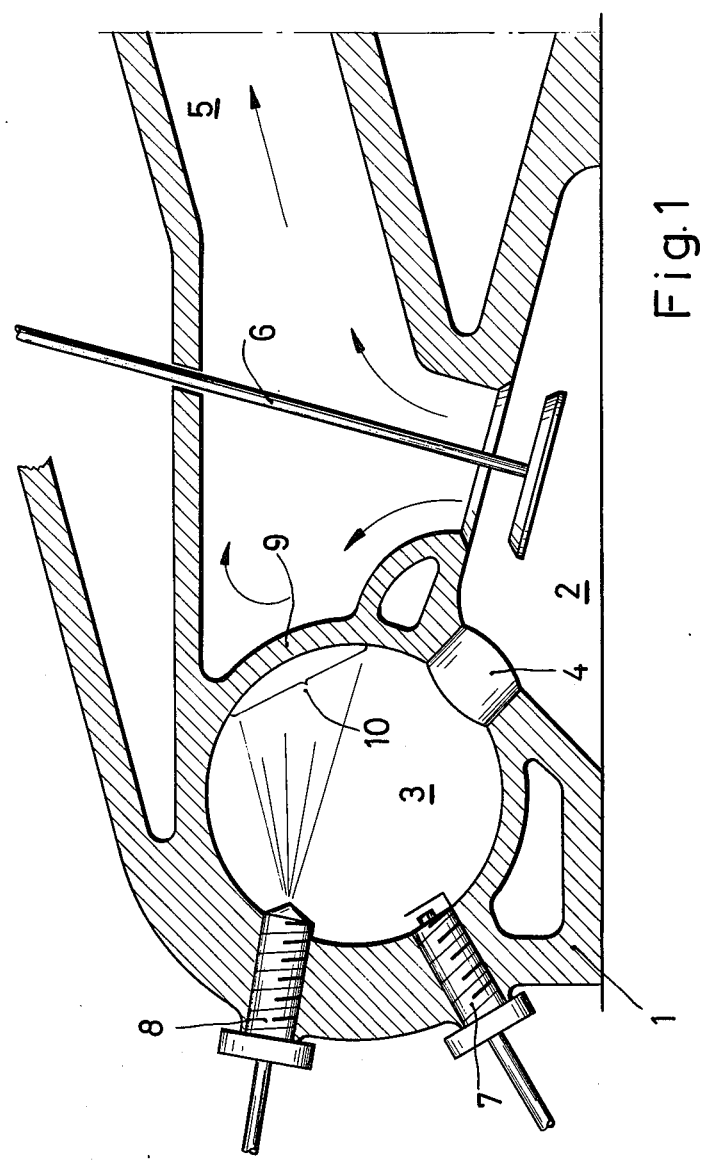
FIG. 1 is a cross-sectional view through a cylinder head of an internal combustion engine with charge stratification and spark ignition showing one embodiment of the present invention.

Referring now to FIG. 1, there is shown a cylinder head 1 having a main combustion chamber 2 and an auxiliary combustion chamber 3 communicating with the main combustion chamber 2 by means of a connecting passage 4. An exhaust conduit 5 communicates with the main combustion chamber 2 and is controlled by a conventional exhaust valve 6. During the exhaust stroke of the piston (not shown) of the internal combustion engine, the exhaust valve 6 is opened to permit hot exhaust gases from the main combustion chamber 2 to flow into the exhaust conduit 5. An intake conduit (not shown) also communicates with the main combustion chamber 2 for supplying a fuel-aor-mixture thereto. A conventional intake valve (not shown) controls the flow of the fuel-air-mixture into the main combustion chamber 2, the fuel-air-mixture being delivered by a mixture formation device, i.e. by a carburetor or by a fuel injection device.

As shown in FIG. 1, a spark plug 7 as well as a fuel injection nozzle 8 may project into the substantially spherical auxiliary combustion chamber 3. The nozzle 8 injects fuel into the auxiliary combustion chamber 3, while the spark plug 7 ignites a fuel-air mixture in the auxiliary combustion chamber 3. The flame front created by the ignition of the fuel-air mixture advances through the connecting passage 4 into the main combustion chamber 2 to ignite the fuel-air-mixture therein. The fuel-air-mixture in the main combustion chamber 2 is preferably leaner, in fuel content, than the fuel-air mixture in the auxiliary combustion chamber 3. In place of, or in addition to, the fuel injection nozzle 8, there may be also provided an auxiliary intake conduit (not shown) communicating with the auxiliary combustion chamber 3. When used, the auxiliary intake conduit may be provided with a corresponding auxiliary intake valve (not shown) which delivers a fuel-rich mixture or clean air to the auxiliary combustion chamber 3 for scavenging purposes.

A substantially thin-walled portion 9 of the auxiliary combustion chamber 3 is contiguous with and projects into the exhaust conduit 5. Because an outer surface of the portion 9 of the auxiliary combustion chamber 3 is in direct heat exchange contact with the hot exhaust gases flowing through the exhaust conduit 5, the portion 9 of the auxiliary combustion chamber 3 is rapidly heated, even during the cold starting and the warming-up phase of the internal combustion engine. Preferably, the portion 9 of the auxiliary combustion chamber 3 which is in direct heat exchange contact with the hot exhaust gases comprises approximately 30 to 50% of the total wall area of the auxiliary combustion chamber 3. Moreover, the fuel emerging from the injection nozzle 8 should preferably impinge on an inner surface 10 of the auxiliary combustion chamber 3 substantially adjacent the portion 9, so that the injected fuel which absorbs heat from the inner surface 10 of the auxiliary combustion chamber 3 can be rapidly and completely evaporated during the cold starting and the warming-up phase of the internal combustion engine. Evaporation of the fuel facilitates the formation of a homogeneous and easily ignitable fuel-air mixture, thereby ensuring that the combustible gases in the main combustion chamber 2 are perfectly ignited resulting in combustion products low in noxious substances.

Figure 2:
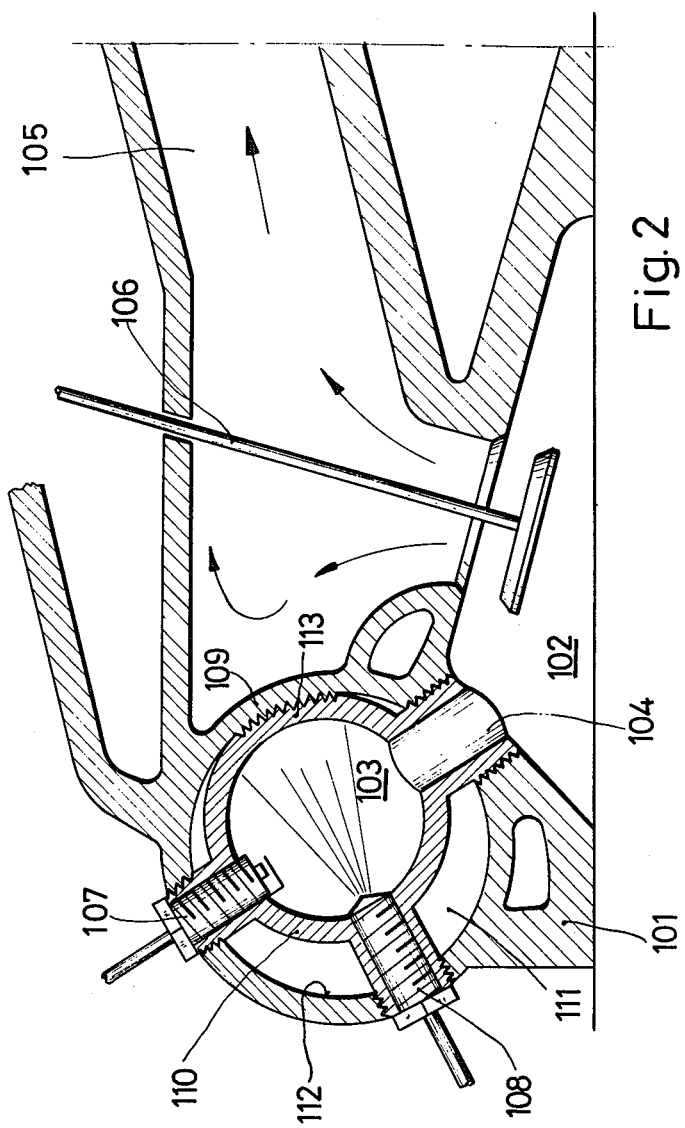
FIG. 2 is a cross-sectional view through a cylinder head of an internal combustion engine with charge stratification and spark ignition showing an alternate embodiment of the present invention.

Referring now to FIG. 2, an auxiliary combustion chamber 103 is formed by a thin-walled shell 110 inserted into a cavity 111 in a cylinder head 101. According to this alternative embodiment, the thin-walled shell 110 may be spacedly positioned from surrounding walls 112 of the cylinder head 101, except for a portion 113 which is contiguous with a portion 109 of the surrounding walls 112 which is in direct heat exchange contact with hot exhaust gases flowing through an exhaust conduit 105 from a main combustion chamber 102. By utilizing a thin-walled shell 110 consisting of a material with good thermal conductivity, the heat given off by the hot exhaust gases may be transmitted to and distributed over the entire wall area of the auxiliary combustion chamber 103 with comparative uniformity to further facilitate the formation of the homogeneous and easily ignitable fuel-air mixture. Otherwise, a connecting passage 104, an exhaust valve 106, a spark plug 107 and a fuel injection nozzle 108 function in substantially the same manner as their equivalent components in the embodiment of FIG. 1.

It will be understood that the above described embodiments are merely exemplary and that persons skilled in the art may make many variations and modifications without departing from the spirit and scope of the invention. All such modifications and variations are intended to be included within the scope of the invention as defined in the appended claims.

We claim:

1. In a spark ignited internal combustion engine operated with charge stratification and including a cylinder head having a main combustion chamber, an auxiliary combustion chamber connected to the main combustion chamber through a connecting passage, fuel delivery means for supplying fuel to the auxiliary combustion chamber, ignition means for igniting a fuel-air mixture in the auxiliary combustion chamber, and an intake and an exhaust conduit communicating with the main combustion chamber; the improvement wherein:

the auxiliary combustion chamber has at least one wall portion in heat exchange relationship with hot exhaust gases flowing through the exhaust conduit from the main combustion chamber of the internal combustion engine, the auxiliary combustion chamber being positioned in the immediate vicinity of the exhaust conduit in such a manner that the wall portion of the auxiliary combustion chamber in heat exchange relationship with hot exhaust gases flowing through the exhaust conduit from the main combustion chamber projects into the exhaust conduit, whereby hot exhaust gases flowing through the exhaust conduit flow externally around the wall portion of the auxiliary combustion chamber to heat the auxiliary combustion chamber and maintain the auxiliary combustion chamber at an elevated temperature so that fuel components of a fuel-air mixture in the auxiliary combustion chamber are rapidly evaporated.

2. The internal combustion engine of claim 1, wherein the wall portion of the auxiliary combustion chamber projecting into the exhaust conduit is thin-walled.

3. The internal combustion engine of claim 1, wherein the wall portion of the auxiliary combustion chamber projecting into the exhaust conduit comprises approximately 30 to 50% of the total wall area of the auxiliary combustion chamber.

4. The internal combustion engine of claim 1, wherein the fuel delivery means is an injection nozzle, the injection nozzle being arranged such that the conical spray emanating from the injection nozzle impinges the auxiliary combustion chamber substantially adjacent the wall portion thereof in heat exchange contact with hot exhaust gases emitted from the main combustion chamber.

5. The internal combustion engine of claim 1, wherein the cylinder head has a cavity defined by surrounding walls of the cylinder head, a portion of the surrounding walls of the cylinder head being in direct heat exchange contact with hot exhaust gases flowing through the exhaust conduit; and wherein the auxiliary combustion chamber is a thin-walled shell spacedly positioned in the cavity a distance from the surrounding walls of the cylinder head, except for the wall portion projecting into the exhaust conduit, the wall portion being contiguous with the portion of the surrounding walls of the cylinder head in direct heat exchange contact with hot exhaust gases flowing through the exhaust conduit.

* * * * *

UNITED STATES PATENT AND TRADEMARK OFFICE
CERTIFICATE OF CORRECTION

PATENT NO. : 4,040,393
DATED : August 9, 1977
INVENTOR(S) : Decker et al

It is certified that error appears in the above-identified patent and that said Letters Patent are hereby corrected as shown below:

First page, item 54, and Column 1, first line, before "IGNITED" insert --SPARK--;
First page, item 56, following two patents should be added to list of U.S. Patent Documents:
   1,925,032   8/1933   Dunner   123/122AA
   2,108,706   2/1938   Crillon   123/ 34A
Column 4, line 3, "fuel-aor-mixture" should read --fuel-air-mixture--.

Signed and Sealed this

*Fifteenth* Day of *November 1977*

[SEAL]

Attest:

RUTH C. MASON
*Attesting Officer*

LUTRELLE F. PARKER
*Acting Commissioner of Patents and Trademarks*